(12) United States Patent
Miyasaka

(10) Patent No.: US 7,487,763 B2
(45) Date of Patent: Feb. 10, 2009

(54) FUEL REFORMER

(75) Inventor: Yoshio Miyasaka, Nagoya (JP)

(73) Assignee: Fuji Kihan Co., Ltd., Nagoya-Shi, Aichi (JP)

( * ) Notice: Subject to any disclaimer, the term of this patent is extended or adjusted under 35 U.S.C. 154(b) by 193 days.

(21) Appl. No.: 10/591,463

(22) PCT Filed: May 13, 2005

(86) PCT No.: PCT/JP2005/008756

§ 371 (c)(1),
(2), (4) Date: Sep. 1, 2006

(87) PCT Pub. No.: WO2005/121540

PCT Pub. Date: Dec. 22, 2005

(65) Prior Publication Data

US 2007/0193537 A1    Aug. 23, 2007

(30) Foreign Application Priority Data

Jun. 9, 2004   (JP) .............................. 2004-171610

(51) Int. Cl.
*F02M 27/02* (2006.01)
(52) U.S. Cl. .................................................. 123/538
(58) Field of Classification Search ......... 123/536–539; 428/469, 472, 701
See application file for complete search history.

(56) References Cited

U.S. PATENT DOCUMENTS

| | | | | | |
|---|---|---|---|---|---|
| 4,672,938 | A | * | 6/1987 | Hoppie et al. | ............... 123/538 |
| 5,069,190 | A | * | 12/1991 | Richards | ..................... 123/538 |
| 5,092,303 | A | * | 3/1992 | Brown | ........................ 123/538 |
| 5,393,723 | A | * | 2/1995 | Finkl | .......................... 502/341 |
| 6,082,339 | A | * | 7/2000 | Wey | ........................... 123/538 |
| 6,770,105 | B2 | * | 8/2004 | Berlin et al. | .................. 44/321 |
| 7,156,081 | B2 | * | 1/2007 | Ratner et al. | ................ 123/538 |
| 2002/0055005 | A1 | * | 5/2002 | Miyasaka | .................... 428/472 |
| 2004/0265214 | A1 | * | 12/2004 | Anderson | ................... 423/579 |
| 2006/0246223 | A1 | * | 11/2006 | Miyasaka | ................ 427/372.2 |

FOREIGN PATENT DOCUMENTS

| | | |
|---|---|---|
| JP | 09-155203 | 6/1997 |
| JP | 2887703 | 2/1999 |

(Continued)

OTHER PUBLICATIONS

Patent Abstract of Japan, Publication No. 2003-160790, Published Jun. 6, 2003.

(Continued)

*Primary Examiner*—M. McMahon
(74) *Attorney, Agent, or Firm*—Shlesinger, Arkwright & Garvey LLP

(57) ABSTRACT

A fuel reformer which can improve fuel cost is provided. The fuel reformer 1 is formed by filling a granular catalytic material 10 provided with a metal oxide layer having an oxygen deficit tilting structure formed on the surface by shot peening in a process chamber 24 formed in a casing 20 having a fuel inlet 21 and an outlet 22.

The fuel introduced into this fuel reformer 1 is activated by contact with the metal oxide layer 12 formed on the surface of said catalytic material 10 so that the fuel cost of the combustion apparatus to which the fuel is supplied is improved.

13 Claims, 4 Drawing Sheets

FOREIGN PATENT DOCUMENTS

| | | |
|---|---|---|
| JP | 2002-85981 | 3/2002 |
| WO | WO 00/32922 | 6/2000 |

OTHER PUBLICATIONS

Patent Abstract of Japan, Publication No. 10-265783, Published Oct. 6, 1998.
Patent Abstract of Japan, Publication No. 2004-052601, Published Feb. 19, 2004.
Patent Abstract of Japan, Publication No. 11-173222, Published Jun. 29, 1999.
Patent Abstract of Japan, Publication No. 10-196496, Published Jul. 28, 1998.
Patent Abstract of Japan, Publication No. 10-176615, Published Jun. 30, 1998.

* cited by examiner

FUEL REFORMER

BACKGROUND OF THE INVENTION

1. Field of the Invention

The present invention relates to a fuel reformer for reforming fuel, and particularly to a fuel reformer which reforms and activates fuel supplied to a combustion chamber of an apparatus or equipment for obtaining power, heat generation, etc. by combustion of fuel such as a boiler, a heat treat furnace, a heating furnace, an internal combustion engine, a space heater, a drier and others (they are generally called as "combustion apparatus" in this specification).

2. Description of Related Art

Various measures for improvement of air pollution have been taken recently for preservation of global environment, and taking the auto industry as an example, various measures to reduce emissions have been promoted.

Particularly, in the case of a diesel-engine vehicle, its emission contains NOx which is said to cause health hazards such as respiratory disorders, bronchitis, lung cancer, etc. as well as particulate materials (PM) causing black smoke and hazardous materials such as carbon dioxide causing global warming. Among them, the PM causes not only asthma but its carcinogenicity has been pointed out recently. It is very important to reduce emission of PM in addition to reduction of NOx as a measure against air pollution.

Therefore, in the emission material control for a diesel vehicle in large cities by a government, PM was included in addition to NOx which is the conventional target materials for regulation, and for the type of vehicle, a diesel standard-sized car was also included in addition to large-sized cars such as trucks and buses. And the necessity to reduce emission of these hazardous materials has been increased.

To be concrete, in order to meet the criteria of the regulation for a diesel vehicle passing through a large city in the future, it will be necessary to replace a vehicle with one provided with a new diesel engine or to attach an apparatus for reducing the emission of the hazardous materials.

In order to cope with such a situation, various apparatuses have been developed for reducing the hazardous materials in the emission of an automobile. For example, there is known as an emission purifying apparatus a "diesel particulate filter (hereinafter referred to as "DPF") placed in the middle of an exhaust passage for the emission for absorbing and removing PM exhausted by a diesel engine.

This DPF consists of a collection of porous ceramic cells in the honeycomb structure for capturing PM exhausted from the diesel engine when it passes through the wall of the cell and burning it so that diffusion of PM into the air is restrained.

However, DPF has the following problems.

Though the DPF can effectively reduce PM, it can not reduce both PM and NOx since a technology to remove NOx at the same time has not been established.

A catalyst capable of reducing both PM and NOx has been developed, but it is indispensable for the catalyst to use an engine provided with a common rail (electronic controlled fuel injection device). And moreover, diesel oil with high sulfur level can not be used due to the sulfur which makes lowering of purifying capability unavoidable, and the life depends on the quality of the diesel oil, which constitutes a problem.

Also, it is necessary to develop the DPF in combination with the engine control technology to securely burn the PM and to reduce the emission. Therefore, the DPF to be attached to new cars should be developed jointly with diesel engine manufacturers. And the DPF for post-attachment should be designed for each model, and since an engine is a core part of an automobile and is therefore developed for each affiliation, transaction outside the affiliation is difficult, compatibility is poor and after-sale service has a problem.

In the meantime, an emission purifying apparatus with the purpose of removing NOx contained in the emission is disclosed such as those using NOx reduction catalyst for reducing and dissolving NOx. But there is a problem that a high temperature is needed to activate the catalyst or the necessity to add fuel in the emission as a reducing agent complicates the constitution of the device.

The methods for removing the hazardous materials reduce the emission of the hazardous materials emitted into the air by removing the hazardous materials in the emission and then exhausting them, but if the fuel consumption itself required for obtaining the same workload can be decreased, the emission of the hazardous materials can be relatively reduced.

In this way, such a method with the purpose of improving fuel efficiency by activating fuel to be supplied to a combustion apparatus, more particularly, an internal combustion engine, is proposed in the Japanese Unexamined Patent Publication No. 10-196496 that a catalyst in which a precious metal is adsorbed to a porous ceramic is made and this is inputted and immersed in fuel liquid, or a paint in which a catalyst powder is diffused is applied in a tank so as to improve combustion efficiency with that catalyst.

Also, a fuel reformer for carrying out the fuel activation using a photocatalyst is proposed (Japanese Unexamined Patent Publications Nos. 10-176615, 10-265783 and 2004-52601).

Among the prior arts, the method in Japanese Unexamined Patent Publication No. 10-196496 describes that "NOx or SOx can not be removed safely as long as air is burned" through the fuel activation (Lines 29 to 31 on the Left column in Page 6). In order to remove NOx or others, it is necessary to add an additive to the fuel itself or to add a device to clean the emission with a special cleaning liquid in the exhaust system, which makes the apparatus itself large. And it also has various practical problems such as the necessity of drastic reform of the fuel supply and exhaust systems in the internal combustion engine.

In addition, a fuel reservoir tank using a photocatalyst as a fuel reformer catalyst is proposed in Japanese Unexamined Patent Publication No. 10-176615, but this photocatalyst exerts photocatalytic effect in response to the ultraviolet ray. Thus, in order to obtain the photocatalytic effect in the reservoir tank into which the ultraviolet ray does not reach, it is necessary to provide a light source for irradiating the photocatalyst with the ultraviolet, which makes the constitution of the device complicated and large. Therefore, the fuel reservoir tank in Japanese Unexamined Patent Publication No. 10-176615 becomes a relatively large apparatus, which causes a problem to restrict its installation location such that it can not be mounted on a vehicle.

Also, a fuel reformer which can be mounted on a vehicle and uses a photocatalyst supported by a porous material of a pellet-state particle as a fuel reforming catalyst is disclosed (Japanese Unexamined Patent Publication No. 10-265783), but the photocatalyst used in this apparatus also needs ultraviolet irradiation, and it is necessary to provide a special light source for irradiating ultraviolet rays when installed in a fuel supply system of an automobile into which the ultraviolet rays do not reach, and also, regular maintenance is required for the light source. Moreover, when the porous materials are contained closely in a sealed container of the fuel reformer apparatus, the ultraviolet irradiated from the light source is blocked by other porous materials and does not reach the porous materials with a distance from the light source, and the photocatalytic effect can not be fully exerted.

On the other hand, when the number of porous materials contained in the sealed container is decreased to enable full irradiation of the ultraviolet rays, the fuel reforming performance is lowered and problems can happen that the porous materials collide with each other and crush due to vibration when the automobile is driving or that broken pieces generated by the crush clog the fuel filter.

In the meantime, in the fuel reformer in the Japanese Unexamined Patent Publication No. 2004-52601, a porous plate made of lath-state mesh or honeycomb structure on the surface of which a layer of a photocatalytic material is formed is arranged in a chamber of a casing through which the fuel passes, and the layer of the photocatalytic material formed on this porous plate is brought into contact with the fuel for reforming the fuel. The photocatalytic material for reforming the fuel is a metal oxide layer having a structure which exerts the photocatalytic performance in response even to electromagnetic waves (gamma ray, X-ray, visible ray, infrared ray and electromagnetic wave) with the wavelength longer than that of the ultraviolet ray and a bond with oxygen is gradually decreased as goes from the surface to the inside (called as "oxygen deficit tilting structure" in this specification), and even if the fuel reformer is made by containing it in a casing through which the ultraviolet ray does not pass and a light source for irradiating the ultraviolet ray is not provided in the casing, fuel reform can be performed.

However, in the fuel reformer in this publication, the porous plate on the surface of which a layer of metal oxide having the oxygen deficit tilting structure is formed as a catalytic material contained in the casing is included, but the fuel reforming efficiency has hit a peak in the fuel reformer with such a structure, and a fuel reformer with higher efficiency can not be realized.

As an example, in the fuel reformer described as a Test Example 1 in the above Publication, "600 pieces of titanium lath" were used instead of "38 pieces of titanium lath+18 pieces of ceramic honeycombs" used as the porous plate, which is the catalytic material, and the fuel consumption rate was measured with the other conditions made common, but despite the increase in the surface area of the porous plate of about 10 times, improvement of the fuel consumption rate more than the fuel consumption rate described in the Example 1 of the Publication could not be achieved.

The above purpose such as improvement of fuel cost or prevention of generation of hazardous materials is not a problem specific to an internal combustion engine such as the diesel engine but is a common problem for various combustion apparatuses for obtaining generation of power or heat by burning fuel.

Thus, the present invention has an object to provide a fuel reformer which can reform fuel with higher efficiency, supplied to the combustion apparatuses obtaining power or heat by burning fuel such as a boiler, a heat treat furnace, a heating furnace, an internal combustion engine, a space heater, a drier and others, while keeping the advantageous characteristics in the fuel reformer in Japanese Unexamined Patent Publication No. 2004-52601 that provision of a light source or the like for irradiating the ultraviolet ray is not needed and the constitution is relatively simple, light-weight and small-sized so that a target for application is not limited, and it is also an object of the present invention to provide a fuel reformer which can relatively reduce emissions of nitrogen oxide (NOx), particulate material (PM), carbon dioxide, etc. generated with operation of a combustion apparatus by further improving the fuel consumption rate of these combustion apparatuses so as to reduce the fuel quantity to be used.

SUMMARY OF THE INVENTION

To achieve the object, a fuel reformer 1 of the present invention arranged in a fuel supply system from a supply source of fuel to a combustion apparatus comprises a casing 20 provided with an inlet 21 in communication with the supply source of fuel, an outlet 22 in communication with the combustion apparatus, and a process chamber 24 in communication with the inlet 21 and the outlet 22, and a granular catalytic material 10 filled in the process chamber 24 of the casing 20, characterized in that a layer 12 of metal oxide having a structure of which a bonding quantity of oxygen gradually decreases with increasing depth from an upper surface of the layer and having a photocatalytic property responding to an electromagnetic wave with wavelength longer than that of the ultraviolet ray is formed on the surface of the catalytic material 10.

In the fuel reformer 1 with the above construction, it is preferable that the catalytic material 10 is filled in the process chamber 24 so that a space rate is defined as 50% or less, preferably 45% or less as the following equation:

Equation: Space rate (%)=[(capacity inside the process chamber−total volume of the catalytic material)/capacity inside the process chamber]×100.

The fuel reformer 1 of the present invention in which the granular catalytic material 10 filled inside the casing 20 reforms the fuel by contact with the metal oxide layer 12 formed on the surface of the catalytic material 10. When the fuel to be reformed passes through the fuel reformer 1, it flows through the granular catalytic materials 10 contained in a large number inside the casing 20 so that the area of contact with the metal oxide layer 12 formed on the surface of the catalytic material 10 can be secured wide, whereby reforming of the fuel by the metal oxide layer 12 can be carried out efficiently.

As a result, the fuel quantity consumed in this combustion apparatus can be reduced in this way, generated nitrogen oxide (NOx), particulate materials (PM) and carbon dioxide could be reduced drastically.

In the fuel reformer in which the catalytic material 10 is filled in the process chamber 24 with the space rate of 50% or less, preferably 45% or less, the fuel consumption could be remarkably reduced.

Moreover, by filling the catalytic material 10 in the process chamber 24 so that the total of the surface area of the catalytic material 10 is 5,000 $cm^2$ or more, preferably 10,000 $cm^2$ or more per flow rate 0.1 L/min of the fuel passing through the process chamber 24, or in the case where the combustion apparatus is an engine, by filling the catalytic material 10 in the process chamber 24 so that the total of the surface area is 5,000 $cm^2$ or more, preferably 10,000 $cm^2$ or more per displacement 1,000 cc of the engine, and particularly by achieving any of the above filling quantity in combination with the condition wherein the space rate is 50% or less, preferably 45% or less, the reduction of the fuel consumption is further remarkable.

When the particle diameter of the catalytic material 10 is 20 mm or less, preferably 10 mm or less, more preferably 6 mm or less, the surface area of the catalytic material 10 per unit capacity in the process chamber 24 of the casing 20 can be taken wide, and a clearance to become a flow passage for the fuel formed between the catalytic materials 10 becomes relatively narrow and complicated, whereby the fuel flowing through the clearance can be surely brought into contact with the metal oxide layer 12. As a result, the fuel reformer 1 with improved fuel reforming efficiency could be provided.

When the catalytic material 10 which is formed in the hollow state is used, reduction in weight of the fuel reformer 1 could be achieved easily without lowering the fuel reforming efficiency.

Also, when the catalytic material 10 is made in the round shape and an open hole 13 piercing in the diameter direction of the catalytic material 10 is formed, similarly with the catalytic material 10 having the hollow structure therein, weight reduction of the entire fuel reformer 1 is possible and at the same time, by forming the metal oxide layer 12 also in the open hole 13, the surface area of the metal oxide layer 12 in contact with the fuel can be expanded without increasing the size of the entire fuel reformer 1, whereby the fuel reformer 1 with higher efficiency could be provided.

In the fuel reformer in which a lid body 26 is removably attached to at least one of both end openings of the casing body 23, maintenance such as replacement of filled catalytic material is easy, and the catalytic material 10 can be filled easily inside the process chamber 24 of the casing 20 without a play.

Moreover, by forming at least an end of the process chamber 24 with a mesh body 30, the catalytic material filled inside the process chamber 24 is held between these mesh bodies 30, whereby no play is generated in the process chamber 24 and mutual collision or the like can be prevented.

BRIEF DESCRIPTION OF THE DRAWINGS

The objects and advantages of the invention will become apparent from the following detailed description of preferred embodiments thereof provided in connection with the accompanying drawings in which.

DETAILED DESCRIPTION OF THE PREFERRED EMBODIMENTS

Figure 1:
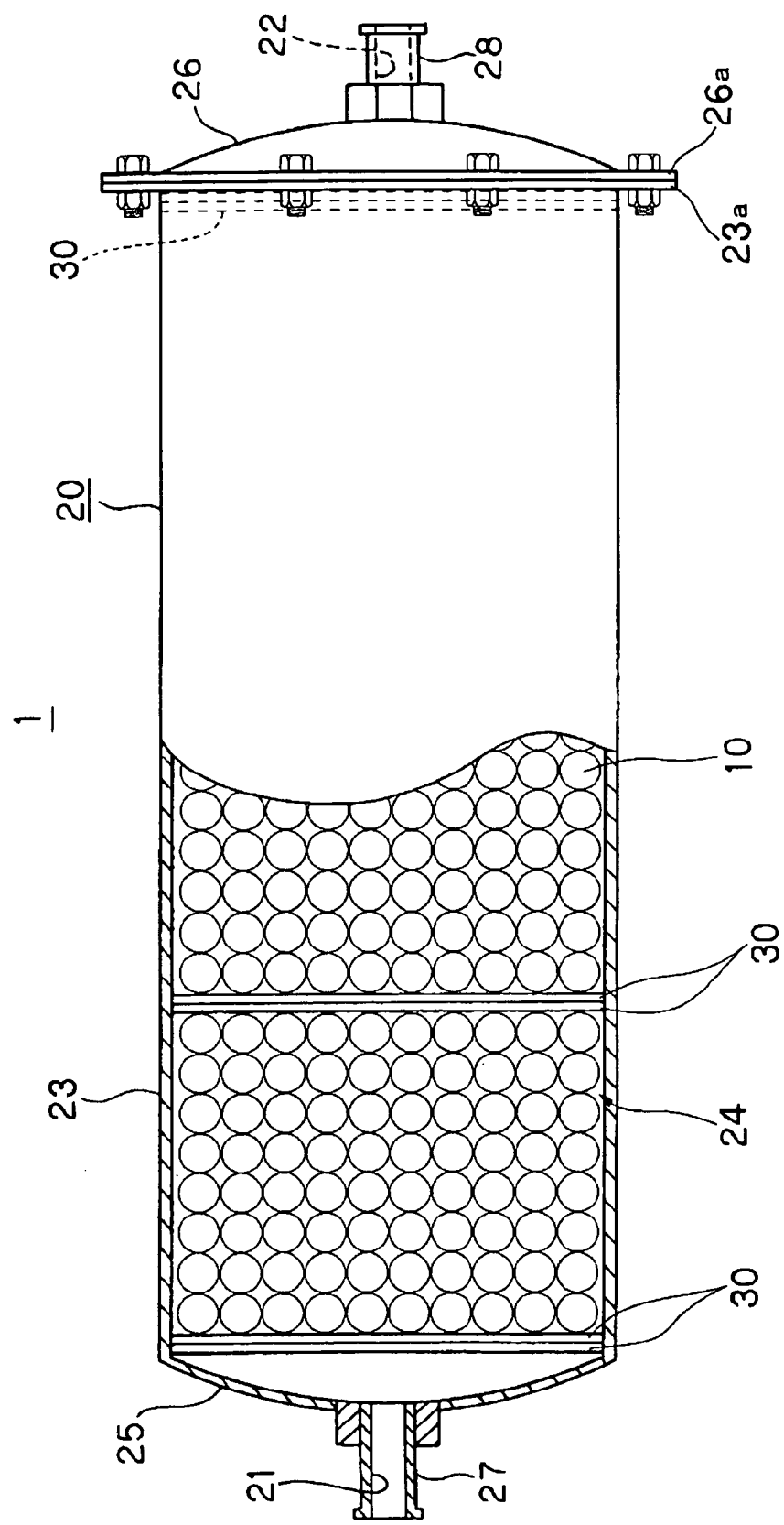
FIG. 1 is a sectional view of an essential part of a fuel reformer showing a preferred embodiment of the present invention.

The fuel reformer 1 of the present invention will be described below referring to drawings.

Overall Structure of the Fuel Reformer

The fuel reformer 1 of the present invention is arranged in the fuel supply system from the fuel supply source such as a fuel tank to the combustion apparatus and provided with a construction, inside the process chamber 24 of the casing 20 through which the fuel can pass, in which the catalytic material 10 having a structure of which a bond with oxygen is decreased gradually as goes from the surface to the inside and a metal oxide layer having a photocatalytic property responsive to an electromagnetic wave with the wavelength longer than that of the ultraviolet ray is formed on the surface of a granular material made of metal, ceramic or their mixture is filled, and by having the fuel pass through the catalytic materials 10 filled inside the process chamber 24 of this casing 20, the fuel to be reformed is brought into contact with the metal oxide layer formed on the surface of the catalytic material 10, whereby reforming of the fuel is enabled.

The constitution of the casing 20 and the catalytic material 10, which are major components of the fuel reformer 1 of the present invention, will be described below in detail, respectively.

Casing

The casing 20 constituting one of the major components of the fuel reformer 1 of the present invention forms a space for containing the catalytic material 10 formed in the granular state inside, introducing the fuel to be reformed and having it pass through the contained catalytic materials 10 so that the catalytic material 10 is brought into contact with the fuel, and as shown in FIG. 1, the catalytic material 10 is contained and at the same time, the process chamber 24 through which the introduced fuel passes is formed inside.

And this casing 20 is provided with the inlet 21 at its one end for introducing the fuel to be reformed into the process chamber 24 and the outlet 22 at the other end for exhausting the reformed fuel having passed through the process chamber 24 of the casing 20.

The material of the casing 20 can be anything only if its quality is not altered by contact with the fuel and it has enough strength to be arranged in the fuel supply system 6 such as in piping for supplying the fuel to a combustion chamber of a combustion apparatus for use, and stainless steel or any other metal, for example, can be used.

Its size is not limited, either, only if, in the relation with the flow rate of the fuel to be supplied to the combustion apparatus, the catalytic material 10 constituting a contact area which can ensure a sufficient contact area for fuel can be contained inside and a fuel flow rate capable of continuous supply of fuel in the quantity required for the combustion apparatus can be secured. Also, the shape can be any shape including cylindrical, square cylinder, polygonal cylinder, etc.

It is preferable that the casing 20 is constituted capable of filling the catalytic material in the chamber 24 formed inside the casing 20 without a play so that sufficient contact is secured between the fuel and the metal oxide layer formed on the surface of the catalytic material contained inside the casing 20 when introducing the fuel, and by this, if the fuel reformer of the present invention is installed in a combustion apparatus for which occurrence of vibration or the like is expected in use such as a fuel supply system for an engine of an automobile, for example, collision or the like between the catalytic materials due to vibration or the like can be prevented and breakage such as crack or chip due to the collision can be prevented.

Also, by having the catalytic material contained in the casing 20 in this way without a play, the surface area of the metal oxide layer in contact with fuel can be increased so as to improve the reforming efficiency of the fuel.

In this way, in order to fill the catalytic material fully in the casing 20 without room, the casing 20 of the fuel reformer of the present invention comprises a cylindrically formed body portion 23 of the casing and lid bodies 25, 26 for covering both end openings of the body portion 23, and it is preferable that at least one of the lid bodies 25, 26 (lid body 26 in the illustrated example) is removably attached to the body portion 23.

In this preferred embodiment, a flange 23a projecting in the direction of an outer circumference is formed on the peripheral edge of at least one of end openings of the body portion 23, and a flange 26a projecting from the peripheral edge of the lid body 26 is superimposed on this flange 23a through a gasket or the like. In this superimposed state, a bolt is inserted into a bolt hole piercing both the flanges 23a, 26a, and one lid body 26 of the lid bodies 25, 26 is removably fixed to one end opening of the body portion 23 by being screwed the bolt in a nut.

In this way, by removably attaching the lid body 26 covering at least one of opening ends of the body portion 23 of the casing, the catalytic material 10 can be easily filled in the process chamber 24 of the casing 20 without a play by slightly pushing the catalytic material 10 filled in the casing 20 when covering the opening end of the body portion 23 with this lid body.

Also, by enabling removal attachment of the lid body 26 covering one end opening of the casing body portion 23 in this way, maintenance such as replacement of the catalytic material once contained in the casing 20 and used for reforming the fuel can be easily performed.

It is preferable that the end of the process chamber 24 formed in this casing 20 is formed by a porous plate such as a metallic mesh 30 preferably having flexibility, and by forming the end of the process chamber 24 by a mesh body 30 such as a metallic mesh, the filled catalytic material is fixed by the metallic mesh 30 which makes generation of a play difficult, and outflow of the catalytic material 10 itself, chipped or cracked catalytic material or the metal oxide layer chipped off from the surface of the catalytic material is captured by the porous plate such as the metallic mesh 30 playing a role of a filter, whereby outflow of these foreign substances from the process chamber together with the fuel can be prevented.

Particularly, if the lid bodies 25, 26 covering the opening ends of the casing body portion 23 are made in the curved shape expanded outward as shown in FIG. 1, when the opening end of this casing body portion is covered by these lid bodies after the catalytic material 10 is filled in the casing body portion 23, there is a fear that a clearance in which the catalytic material is not filled is generated in the expanded portion. But by covering the opening ends of the casing body portion 23 with the porous plate such as the metallic mesh 30 having flexibility, even if the opening ends of the casing body portion 23 is covered by the curved shaped lid body 26, the catalytic material 10 can be filled in the casing 20 without a play.

Figure 2:
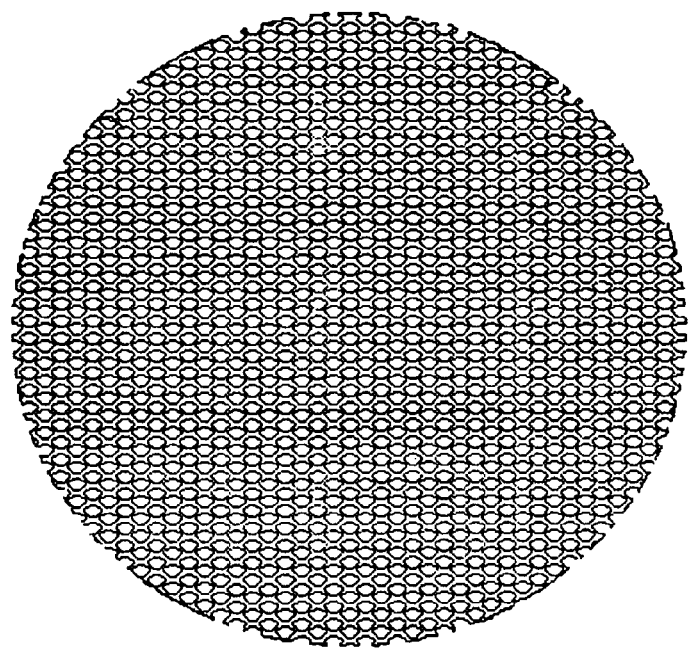
FIG. 2 is a plan view of a metallic mesh (lath), which is a porous plate.
Figure 3:
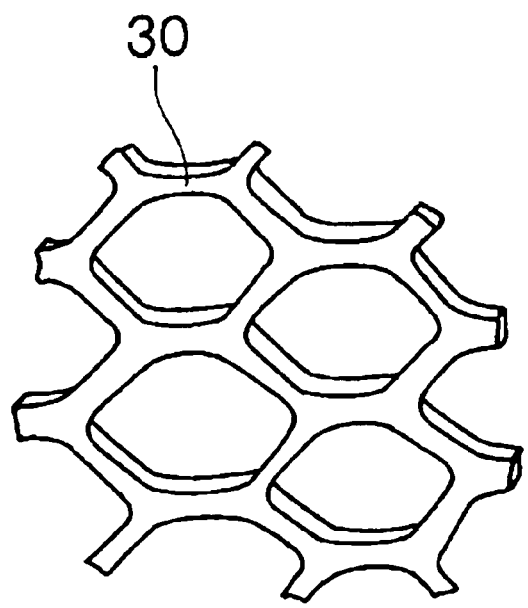
FIG. 3 is a partially expanded perspective view of the metallic mesh.

As this metallic mesh 30, a metallic mesh made of titanium with high resistance against corrosion or the like is used with the line diameter of about 0.2 mm and having an open hole 13 formed in the almost diamond shape of the longer width 3 mm×shorter width 2 mm (See FIGS. 2 and 3).

The metallic mesh 30 made of titanium used in this preferred embodiment is a metallic mesh with the structure of so-called "lath." This "lath" includes a metal lath in which a large number of cut lines are made in a thin sheet made of metal with a certain interval and this thin sheet is extended in the direction perpendicular to the length direction of the cut lines in the mesh state, or a wire lath molded by metal wires, but the metallic mesh 30 used as the porous plate in the present invention can be any of these structures. Also, not limited to the lathes, known various types of metallic mesh can be used only if it has a resistance against the fuel to be reformed.

Also, the casing 20 in this preferred embodiment is made of austenitic stainless steel (SUS304) and formed with the both end openings of the casing body portion formed in the cylindrical shape covered with the lid bodies 25, 26 whose centers are expanded in the direction extending the both ends of this casing body portion. Connecting fittings 27, 28 provided with a flow passage communicating with the process chamber 24 formed in the body portion are mounted at the center of each of these lid bodies 25, 26, and the inlet 21 and the outlet 22 are formed by the flow passages in these connecting fittings 27, 28.

In the fuel reformer 1 shown in FIG. 1, the fuel flowing direction is not particularly limited, but the inlet 21 and the outlet 22 can be switched with each other for use.

Catalytic Material

The catalytic material contained in the casing 20 is a finite or a non-finite form granular material in which the metal oxide layer is formed on the surface of the granular material formed from metal, ceramic or a mixture of them by shot peening using a metallic powder body exerting photocatalytic property by oxidation.

In this preferred embodiment, the granular material constituting the core of this catalytic material is in the spherical shape with the diameter of 20 mm or less, preferably 10 mm or less or more preferably 6 mm or less, and a layer of metal oxide is formed on its surface by injecting metal exerting the photocatalytic property by oxidation as mentioned above.

Figure 4:
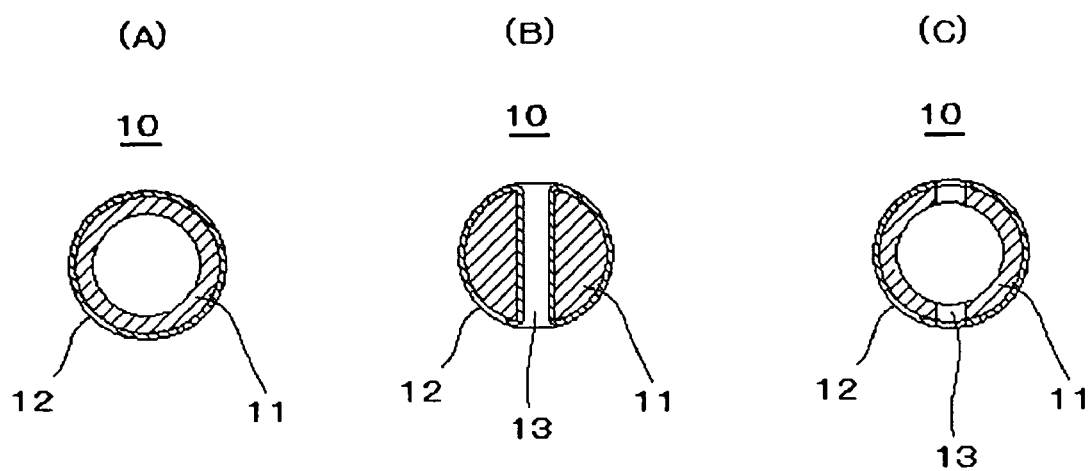
FIG. 4 are sectional views of a catalytic material, in which (A) shows a hollow structure, (B) shows a perforated structure and (C) shows the catalytic material in the hollow and perforated structure.

As a granular material made of metal, ceramic or a mixture of them forming the layer of metal oxide, the one in the spherical shape as shown in FIG. 1 can be used, but in order to reduce the weight of the entire apparatus, the hollow or perforated shape as shown in FIGS. 4(A) and (B) can be used. Moreover, as shown in FIG. 4(C), it can be formed in the hollow and perforated shape.

When the catalytic material 10 is made in the perforated shape, it is preferable to form the metal oxide layer 12 which will be described later also in the open hole 13 formed in the granular material 11 since the introduced fuel also flows through the open hole formed in the catalytic material 10. By this, the surface area of the metal oxide layer 12 in contact with the fuel can be increased without increasing the entire size of the casing 20 and hence the fuel reformer 1 or the quantity of the catalytic material 10 to be filled in the casing 20, and also, flow of the fuel through the catalytic materials 10 becomes complicated, whereby fuel reforming efficiency can be improved.

As a material of the granular material 11 constituting the core of the catalytic material, anything can be used only if the metal oxide layer is formed on its surface by injecting the metallic powder exerting the photocatalytic property by oxidation, as will be described later and is not altered in quality or corroded even in contact with the fuel to be reformed but is provided with enough strength to be arranged in the fuel supply system 6 leading from the fuel tank 2 to the combustion chamber 5 of the internal combustion engine. As an example, metal such as titanium or stainless steel, ceramics including alumina, ferrite, etc. or a mixture of them can be used.

Particularly, if ceramic generating a far-infrared ray is used as the granular material 11 to be the core of the catalytic material 10, for example, it becomes possible to reform the fuel by activating it through irradiation of the far-infrared ray, and the fuel can be reformed with much higher efficiency with synergic effect with reforming by the metal oxide layer 12.

Also, the particle diameter, its shape or size uniformity is not limited, either, only if the required flow of fuel is not hindered but a sufficient contact area for the fuel can be secured, but the grain can be formed into a polygon, circle, ellipse or any other shapes.

The particle diameter of the catalytic material to secure the contact area with the fuel in this way is 20 mm or less, as an example, preferably 10 mm or less, or more preferably 6 mm or less.

A single type of the catalytic material 10 can be used by filling it in a large number in the casing 20, but two, three or more types of the catalytic materials 10 with different size or shape can be used in combination. Or it is also possible to constitute to expand the surface area of the metal oxide layer in contact with the fuel by filling the catalytic material 10 in the mixed state in the casing 20 so that the catalytic materials with a relatively small diameter are arranged between intervals formed among the catalytic materials with a relatively large diameter.

On the surface of the granular material to be the core of the catalytic material, the metal oxide layer which is a metal oxide exerting the photocatalytic property by oxidation as mentioned above and has the tilting structure of which a bonding quantity of oxygen gradually decreases with increasing depth from an upper surface of the layer (called as "oxygen deficit tilting structure" in this specification) is formed, and when the fuel to be reformed passes through the fuel reformer 1, it is brought into contact with this metal oxide layer formed on the surface of the catalytic material and reformed.

This metal oxide layer 12 having such an oxygen deficit tilting structure can be formed by projecting at a high speed a metal powder such as titanium, for example, exerting the photocatalytic property by oxidation toward the surface of the granular material 11 to be the core of the catalytic material 10. A metal used for this layer formation (injected powder) can be titanium (Ti), zinc (Zn), tungsten (W), tin (Sn), zirconium (Zr) or an alloy of them. And by injecting these metallic powder toward the surface of the granular material to be the core of the catalytic material made from metal, ceramics or a mixture of them using a compressed air, for example, at a high speed, the metallic powder is fused and attached to the surface of the granular material and also oxidized through a bond with oxygen in the injected granular material and peripheral atmosphere at this fusion and attachment, the metal oxide layer such as $TiO_2$, $ZnO$, $WO_3$, $SnO_2$, $ZrO_2$ or the like is formed on the surface of the granular material.

The metal oxide layer formed by the method has the oxygen deficit tilting structure in which a bond with oxygen is gradually decreased as the depth from the layer surface increases, and the metal oxide layer having this structure exerts the photocatalytic performance which activates the fuel to be reformed in response to the electromagnetic wave with the wavelength longer than that of the ultraviolet ray (gamma ray, X-ray, visible ray, infrared ray, electric wave, etc.).

The metal oxide such as $TiO_2$, $ZnO$, $WO_3$, $SnO_2$, $ZrO_2$, etc. has been known as a so-called photocatalyst exerting excellent resolution function by irradiation of the ultraviolet ray, but these metal oxides normally exert the photocatalytic function by irradiation of the ultraviolet ray. Therefore, in order to obtain the photocatalytic action by the metal oxide in the fuel supply part of the internal combustion engine to which the ultraviolet ray does not reach, it was necessary to independently provide a special light source for irradiating the ultraviolet ray to the metal oxide.

However, the metal oxide layer 12 having the oxygen deficit tilting structure formed on the surface of the catalytic material 10 as mentioned above has a property to respond to the electromagnetic wave with the wavelength longer than that of the ultraviolet ray (gamma ray, X-ray, visible ray, infrared ray, electric wave, etc.) and can exert the photocatalytic function if there is energy of any of the electromagnetic waves. Even if they are arranged in the casing 20 as above and used in the situation that the ultraviolet or visible rays do not reach, a light source for irradiating the ultraviolet ray as a conventional photocatalyst is not required to exert the catalytic action.

Moreover, the metal oxide layer 12 formed by injection of the metallic powder has an advantage that it has the stable oxygen deficit tilting structure.

The shape of the metallic powder used for formation of the metal oxide layer 12 having the oxygen deficit tilting structure is preferably spherical or polygonal with the particle diameter of 200 μm or less or preferably 30 to 100 μm. The injection pressure is preferably 0.3 MPa or more, or more preferably 0.5 MPa or more so as to stabilize the oxidized layer formed on the surface, though depending on the material or the like of the injected powder.

Various types of metal, not limited to the examples, can be used only if the photocatalytic performance is exerted by oxidation, and also, several types of the metals can be used in mixture.

Moreover, when forming a layer by injecting the metallic powder, by mixing precious metal powders such as platinum (Pt), palladium (Pd), silver (Ag), copper (Cu), etc. and injecting them at the same time, these metals can be supported in the layer, or metal ions such as vanadium, chrome, etc. can be implanted into the formed metal oxide layer 12.

By supporting these precious metals or implanting metal ions in the metal oxide layer 12, the photocatalytic performance can be further improved, and fuel can be reformed efficiently.

In the preferred embodiment, a titania (titanium oxide, $TiO_2$) layer was formed by blasting a titanium (Ti) powder onto the surface of the granular material and the photocatalytic action was obtained by this titania layer. The photocatalytic function in the electromagnetic wave responsive type intended by the present invention does not require irradiation of the ultraviolet ray, and in the point that oxidation and reduction are carried out, it has a function different from conventional general photocatalysts performing only oxidation and dissolution. In order to form the metal oxide layer having the oxygen deficit tilting structure, titanium oxide used in the present embodiment is comprised of titanium oxide of rutile type and/or anatase type.

It is preferable that the catalytic material 10 constituted as above is filled in the process chamber 24 with the space rate defined as 50% or less, preferably 45% or less as the following equation:

Equation: Space rate (%)=[(Capacity in the process chamber−Total volume of the catalytic material)/Capacity in the process chamber]×100

By this, the fuel passing through the fuel reformer 1 is favorably brought into contact with the metal oxide layer 12 formed on the surface of the catalytic material 10, and the fuel could be reformed securely.

Moreover, the catalytic material 10 is filled in the process chamber 24 so that the total of its surface area is 5,000 $cm^2$ or more, preferably 10,000 $cm^2$ or more per fuel flow rate of 0.1 L/min passing through the process chamber 24.

Particularly, if the combustion apparatus to which the reformed fuel is supplied is an engine, the process chamber 24 may be filled so that the total of the surface area is 5,000 $cm^2$ or more, preferably 10,000 $cm^2$ or more per displacement 1,000 cc of the engine, regardless of the flow rate of the fuel passing through the fuel reformer 1.

In this way, by setting the surface area of the catalytic material 10 to be filled in the process chamber 24 of the fuel reformer 1 to the numeral value in the relation with the flow rate of the fuel passing through the fuel reformer 1 or the displacement amount of the combustion apparatus (engine) to which the reformed fuel is supplied, the surface area of the catalytic material in contact with the fuel can be fully ensured in the relation with the fuel consumption or the displacement of the combustion apparatus (engine), and the fuel consumption could be securely reduced.

Particularly, in the fuel reformer 1 satisfying the condition of the space rate of 50% or less, preferably 45% or less and the condition of the surface area of the catalytic material 10 for the fuel flow rate or the displacement of the combustion apparatus (engine) at the same time, fuel reform could be carried out more securely, and the fuel consumption in the combustion apparatus to which the reformed fuel is supplied could be remarkably reduced.

Action by the Fuel Reformer

It is assumed that the fuel cost by using the fuel having passed the fuel reformer 1 of the present invention is improved because the combustion materials are activated (ionized) immediately before combustion reaction and this activation occurs as a pre-phenomenon of combustion before transit to oxidation reaction (combustion).

One of energies causing this pre-phenomenon is thermal energy, which is one of three elements of combustion, and the metal oxide having the oxygen deficit tilting structure is thought to contain a considerable amount of energy to activate fuel. As this energy, an ionized radiation ray for activating materials is thought to be contained.

Therefore, it is assumed that, when the fuel introduced into the fuel reformer 1 of the present invention passes through the catalytic materials 10 filled in the process chamber 24 of the casing 20 and is brought into contact with the metal oxide layer 12 formed on the surface of the catalytic material 10, the fuel (CmHn) is ionized by this low level of the radiation ray (natural phenomenon level radiation ray) and combustion reaction is promoted so that the fuel cost is improved.

Moreover, in the fuel reformer 1 of the present invention in which the granular catalytic material 10 is filled in the casing 20, particularly in the fuel reformer 1 in which the catalytic material 10 is filled in the process chamber 24 with the space rate, with the surface area of the catalytic material against the fuel flow rate or the displacement of the combustion apparatus (engine), the surface area of the metal oxide layer 12 in contact with the fuel is large, and moreover, since the fuel introduced into the casing 20 passes through the flow passage in the complicated shape formed between the catalytic materials 10, the time of contact with the metal oxide layer is long and since contact with the metal oxide layer 12 occurs securely, the fuel can be reformed with high efficiency in the fuel reformer 1 of the present invention.

DETAILED DESCRIPTION OF THE PREFERRED EMBODIMENT

The results of the performance tests of the fuel reformer of the present invention described above will be explained below.

In each of the test examples shown below, in the catalytic material used in the fuel reformer of this application, a layer of titanium oxide having the oxygen deficit tilting structure is formed on the surface of a ceramic spherical body, and the details are as shown in Table 1 below.

TABLE 1

Specification of Catalytic Material
Material of the ceramic spherical body: $Al_2O_3 + SiO_2$: 92% or more
Specific gravity of the catalytic material: 3.62

| Diameter (mm) | Weight (g) | Surface area (mm$^2$) | Number of pieces in 1 kg | Surface area per 1 kg (mm$^2$) | Weight per 1000 cm$^3$ (g) |
|---|---|---|---|---|---|
| 2 | 0.015 | 12.56 | 66,667 | 837,338 | 2,132 |
| 3 | 0.047 | 28.26 | 21,277 | 601,228 | 2,030 |
| 4 | 0.147 | 50.24 | 6,803 | 341,782 | 2,042 |
| 5 | 0.205 | 78.50 | 4,000 | 314,000 | 2,018 |
| 6 | 0.400 | 113.04 | 2,500 | 282,600 | 2,000 |
| 8 | 1.000 | 217.60 | 1,000 | 217,600 | 1,924 |
| 10 | 2.100 | 314.00 | 476 | 149,464 | 1,902 |
| 15 | 7.000 | 765.00 | 143 | 109,395 | 1,880 |
| 20 | 16.000 | 1256.000 | 63 | 79,128 | 1,806 |

Also, the "titanium lath" used in the comparative example is the one in which a layer of titanium oxide having the oxygen deficit tilting structure is formed on the surface of the metallic mesh (lath) made of titanium, and the details are as shown in Table 2 below.

TABLE 2

Specification of Titanium Lath
Specific gravity: 4.54

| Length × Width × Thickness (mm) | Weight (g) | Mesh (mm) | Surface area (mm$^2$) |
|---|---|---|---|
| 500 × 500 × 0.2 | 52 | 2 × 3 | 115,000 |
| 500 × 500 × 0.3 | 112 | 2 × 3 | 170,000 |
| 500 × 500 × 0.5 | 176 | 3 × 6 | 170,000 |
| 500 × 500 × 1.0 | 332 | 6.8 × 12.7 | 155,000 |

TEST EXAMPLE 1

The fuel (fuel oil A) having passed the fuel reformer of the present invention was supplied to a drying apparatus using this fuel oil as fuel.

A set temperature in this drying apparatus is 280° C., and the results of measurements of combustion time (minutes) and used amount of fuel (liter) till the temperature inside the drying apparatus becomes 280° C. are shown in Table 1.

The diameter of the cylindrical casing body portion of the fuel reformer used in the Test Example 1 is 100 mm and the length of the cylindrical casing body portion is 900 mm. 15 kg of ceramic spherical balls having the diameter of 3 mm on which the layer of titanium oxide having the oxygen deficit tilting structure are filled as a catalytic material.

Weight of the catalytic material to be filled in the space with the capacity of 1 liter: 2030 g (Table 1)

The specific gravity of the catalytic material is 3.62, accordingly the volume of the catalytic material in the space with the capacity of 1 liter is:

2030/3.62=560.8 cm$^3$

Therefore, the space rate of this catalytic material is:

[(1000−560.8)/1000]×100 =43.92(%)

Also, the weight per grain of the catalytic material is 0.047 g (Table 1), accordingly the total of the surface area of the catalytic material is:

(15000/0.047)×0.2826=90191.5 (cm$^2$)

The consumed fuel in 73 minutes is 22.76 liters (Table 3), accordingly the flow rate per minute of the fuel is:

22.76/73=0.312 (L/min)

Thus, the total of the surface area of the catalytic material per flow rate of 0.1 L/min is:

90191.5/3.12=28907.5 (cm$^2$)

The used drying apparatus is an open-flame type heat generator provided with a gun-type burner as a burning apparatus and its heat value is 300,000 kcal/h.

TABLE 3

| Operating Test of Drying Apparatus (Test Example 1) | | |
|---|---|---|
| Attachment of fuel reforming apparatus | Non | Yes |
| Fuel consumption (L) | 30.31 | 22.76 |
| Combustion time (minutes) | 88 | 73 |
| Improvement rate (%) | 0 | 24.9 |

As a result, if the fuel having passed the fuel reformer of the present invention is used in the required time till the temperature rises to the set temperature (280° C.), the combustion time was reduced by 15 minutes when compared with the case where the non-reformed fuel is used.

Also, for the fuel used till the temperature rises to the set one, if the fuel having passed the fuel reformer of the present invention is used, the fuel amount used could be reduced by 7.55 liters when compared with the case where the normal non-reformed fuel is used.

The "improvement rate" in the Table is a value with the case where the fuel reformer is not attached as a reference and represents the improvement in the fuel consumption rate when the fuel reformer is attached shown by percentage, that is:

[(30.31−22.76)/30.31]×100(%)=24.9(%)

When the fuel reformer of the present invention is attached, the fuel consumption rate is improved as much as by 24.9% when compared with the un-attachment case.

TEST EXAMPLE 2

The fuel reformer of the present invention was attached to a fuel supply system of a small-sized truck, the fuel having passed the fuel reforming apparatus was supplied to its engine and a running test (used in route sales) was carried out. The measurements of the fuel consumption and the improvement rate of the fuel cost at this time are shown in Table 4.

The used fuel reformer has the casing body portion with the diameter of 100 mm and the length of 600 mm, and 10 kg of ceramic spherical balls with the diameter of 3 mm on which titania layers are formed were filled in this casing.

The small-sized truck used in the running test was a diesel engine vehicle of the 2001 model year (travel distance: 45,000 km) with the displacement of 3,000 cc.

The space rate of the catalytic material filled in the casing is 43.92% as with the Test Example 1 and from the weight per grain of the catalytic material: 0.047 g (Table 1), the total of the surface area of the catalytic material is:

(10000/0.047)×0.2826=60127.7 (cm$_2$)

The displacement of the engine, which is a combustion apparatus is 3,000 cc, accordingly the total of the surface area of the catalytic material per 1,000 cc is:

60127.7/3=20042.6 (cm$^2$)

Figure 5:
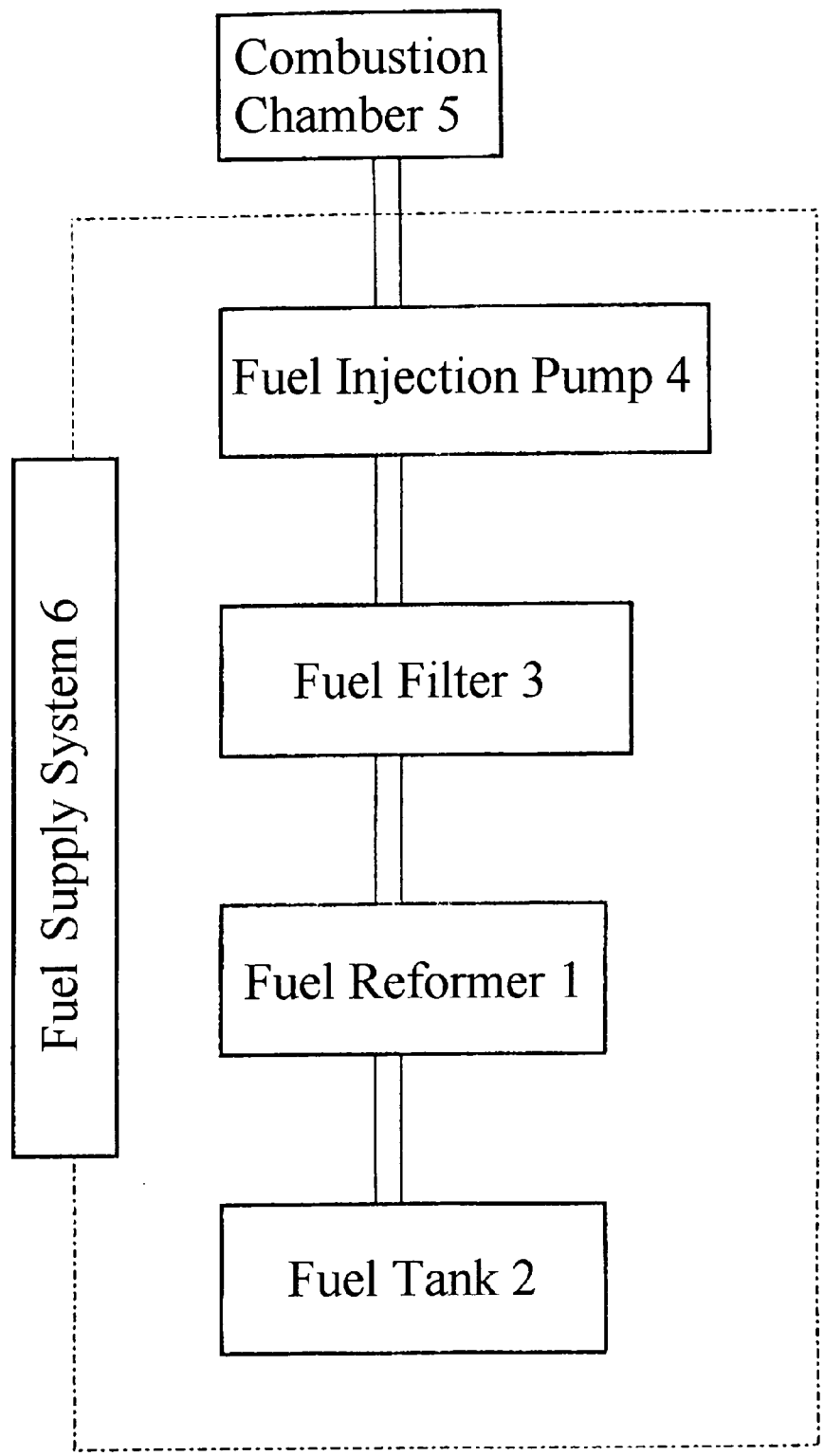
FIG. 5 is an outline explanatory view of a fuel supply system showing arrangement of the fuel reformer.

To the fuel supply system of the automobile is, generally as shown in FIG. 5, a fuel tank 2, a fuel filter 3, a fuel injection pump 4, and a combustion chamber 5 are connected through piping, respectively, and in this Test Example, the fuel reformer is attached in the piping between the fuel tank and the fuel filter.

The fuel reformer is attached at the location because, even if a crack or a chip is generated in the catalytic material or the oxide layer formed on the surface of the catalytic material is partially peeled off or the like and a foreign substance is mixed into the reformed fuel, the foreign substance mixed in the fuel is removed by the filter provided on its downstream side and prevented from being introduced into the combustion chamber. The attachment location of the fuel reformer is not limited to this example, but it may be any location between the fuel tank and the fuel injection pump only if the fuel can be reformed before supply to the combustion chamber.

If the connecting fittings 27, 28 in which flow passages to become the inlet 21 and the outlet 22 are formed are attached to the casing 20, the fuel reformer 1 can be easily attached by replacing an existing pipe communicating between the fuel tank 2 and the fuel filter 3 with an exclusive pipe and by connecting the connecting fittings to this exclusive pipe.

TABLE 4

| Running Test of Small-sized Truck (Test Example 2) | | |
|---|---|---|
| Attachment of fuel reforming apparatus | Non | Yes |
| Average fuel consumption (km/L) | 9.1 | 11.4 |
| Improvement rate (%) | 0 | 20.2 |

As a result, in the small-sized truck with the fuel reformer of the present invention attached, it was confirmed that the fuel cost was improved by 20.2% when compared with the small-sized truck without the fuel reformer attached. Also, improvement in horsepower, pickup and acceleration could be felt, and particularly, decrease of black smoke emission on an ascending slope could be obviously confirmed even visually.

TEST EXAMPLE 3

The fuel reformer of the present invention was attached to a fuel supply system of a small-sized truck (the attachment location is the same as that of the Test Example 2), and a running test (used in route sales) was carried out by supplying the fuel having passed the fuel reformer to the engine. The measurement results of the fuel consumption and the improvement rate of the fuel cost at this time are shown in Table 5.

As a fuel reformer, the one having a casing body portion with the diameter of 100 mm and the length of 300 mm in which 6 kg of a ceramic spherical body with the diameter of 3 mm on which a titania layer is formed is filled.

The small-sized truck used for the running test was a gasoline engine vehicle of the 2003 model year (travel distance of 15,000 km) with the displacement of 2,000 cc.

The space rate of the catalytic material filled in the casing is 43.92 (%) as with the Test Example 1.

The weight per grain of the catalytic material is 0.047 g (Table 1), accordingly the total of the surface area of the catalytic material is:

(6000/0.047)×0.2826=36076.6 (cm$^2$)

The displacement of the engine, which is the combustion apparatus is 2,000 cc, accordingly the total of the surface area of the catalytic material per 1,000 cc is:

$$36076.6/2=18038.3 \text{ (cm}^2\text{)}$$

As a comparative example, a similar running test was carried out using a fuel reformer in which 800 pieces of titanium lath with the thickness of 0.2mm in Table 2 is molded in the disk shape with the diameter of 100mm were inserted in the same casing of the fuel reformer of the present invention The weight of a single piece of titanium lath is 2.08 g, accordingly, the total weight of 800 pieces is 1,664 g and the specific gravity of the titanium lath is 4.54. Thus, the space rate in the fuel reformer in which this titanium lath is filled is:

$$\{[2355-(1664/4.54)]/2355\} \times 100 = 84.44(\%)$$

The surface area of one piece of the titanium lath is 46 cm², accordingly the total surface area of the 800 pieces of titanium lath filled in the casing is:

$$46 \times 800 = 36800 \text{ cm}^2$$

The displacement of the engine, which is the combustion apparatus is 2,000 cc, accordingly, the total of the surface area of the titanium lath per 1,000 cc is:

$$36800/2=18400 \text{ (cm}^2\text{)}$$

TABLE 5

Running Test of Small-sized Truck (Test Example 3)

| Attachment of fuel reforming apparatus | Non | Yes (The example of the present invention) | Yes (Comparative example) |
|---|---|---|---|
| Average fuel consumption (km/L) | 8.7 | 11.6 | 9.2 |
| Improvement rate (%) | 0 | 25 | 5.4 |
| Space rate (%) | — | 43.9 | 84.4 |
| Surface area per 1,000 cc (cm²) | — | 18038.3 | 18400 |

As a result, in the small-sized truck with the fuel reformer of the present invention attached, it was confirmed that the consumed fuel was reduced by 25% when compared with the small-sized truck without the fuel reformer. Also, improvement in horsepower, pickup and acceleration were felt.

In the Test Example 3, the fuel consumption improvement rate is further improved when compared with the test results of the Test Example 2, which is a running test in a diesel engine vehicle. Thus, it was confirmed that the fuel reformer of the present invention exerts higher reforming performance in gasoline than diesel oil.

On the other hand, in the fuel reformer of the comparative example filled with the titanium lath, though reduction in the fuel consumption when compared with the case where the fuel reformer is not attached is confirmed, the improvement rate was extremely lower than the case with the fuel reformer of the present invention.

The fuel reformer of this application and the fuel reformer of the comparative example show an almost equal numeral value in the surface area of the catalytic material filled inside, but their space rates are remarkably different from each other. Thus, it is considered that the difference in the space rate appears as a difference in effect.

Particularly, since the small-sized truck used in the test examples uses an engine with a relatively small displacement, the flow rate of the fuel through the fuel reformer is small, and since the fuel is supplied to the engine without resistance, even if the surface area of the titanium oxide layer is equal, this surface area in the fuel reformer in the comparative example does not act effectively, which seems to appear as a difference in effect.

Therefore, by increasing the surface area of the titanium oxide layer according to the flow rate of the fuel or in the case where the combustion apparatus in use is an engine in a predetermined range according to the displacement of the engine and by setting the space rate in the process chamber to a certain range or less in combination, it was confirmed that the efficiency of fuel reforming by the fuel reformer can be effectively improved.

TEST EXAMPLE 4

The fuel reformer with different filling amount of the catalytic material is attached to a fuel supply system of a small-sized truck (the attachment location is the same as that of the Test Example 2) and a running test (used in route sales) was carried out by supplying the fuel having passed the fuel reformer to the engine. The measurement results of the space rate, surface area of the catalytic material per 1000 cc displacement and improvement rates in the fuel consumption and fuel costs in each of the fuel reformers at this time are shown in Table 6.

In the test Example 4, the fuel reformer is comprised of a casing body portion having the diameter of 100 mm and the length of 300 mm filled with a 5 kg of ceramic balls having the diameter of 4 mm on which the titania layers are formed was prepared, one to seven pieces of them are connected to each other to constitute fuel reformers with the catalytic material filling quantity of 5 kg, 10 kg, 15 kg, 20 kg 25 kg, 30 kg and 35 kg. In Table 6 below, the filling quantity of "0" of catalytic material refers to the running test result by a small-sized truck without the fuel reformer attached.

The small-sized truck used in the running test is a gasoline engine vehicle of the 2003 model year (travel distance of 15,000 km) with the displacement of 2,000 cc.

TABLE 6

Change in Filling Quantity and Fuel Cost Improvement Rate

| Filling quantity of catalytic material (Kg) | Space rate (%) | Surface area per 1000 cc displacement (cm²) | Average fuel consumption (km/L) | Improvement rate (%) |
|---|---|---|---|---|
| 0 | — | — | 8.7 | 0 |
| 5 | 43.6 | 8544.2 | 10.4 | 19 |
| 10 | 43.6 | 17088.4 | 11.0 | 26 |
| 15 | 43.6 | 25632.6 | 11.1 | 28 |
| 20 | 43.6 | 34176.8 | 11.5 | 32 |
| 25 | 43.6 | 42721.0 | 11.7 | 34 |
| 30 | 43.6 | 51265.2 | 11.8 | 36 |
| 35 | 43.6 | 59809.4 | 12.0 | 38 |

As a result, reduction of the fuel consumption was confirmed even if the fuel reformer with the catalytic material filling quantity of 5 kg is used, but the effect was relatively lower than that of the catalytic material filling quantity of 10 kg or more.

Each of the fuel reformers used in the running test has the same space rate, and by setting this space rate to 50% or less, preferably 45% or less and by increasing the total of the surface area of the catalytic material with rise in the engine displacement, a remarkable effect was obtained.

TEST EXAMPLE 5

A plurality of fuel reformers with different particle diameters of catalytic material filled are attached to a fuel supply system of a small-sized truck (attachment location is the same as that of the Test Example 2) and a running test (used in route sales) was carried out by supplying the fuel having passed the fuel reformer to the engine.

Each of the used fuel reformers was prepared so that the casing body portion has the diameter of 100 mm and the length of 300 mm, and ceramic balls with the diameter of 2 mm, 3 mm, 4 mm, 5 mm, 6 mm, 8 mm, 10 mm, 15 mm and 20 mm on which a titania layer is formed are filled in this casing respectively.

The small-sized truck used in the running test is a gasoline engine vehicle of the 2003 model year (travel distance of 15,000 km) with the displacement of 2,000 cc.

The measurement results of the diameter of the catalytic material in the running test, surface area of the catalytic material per 1000 cc displacement, space rate, average fuel consumption and improvement rate are shown in Table 7.

TABLE 7

Change in Space Rate and Surface Area and Fuel Cost Improvement Rate

| Diameter of catalytic material (mm) | Surface area per 1000 cc displacement ($cm^2$) | Space rate (%) | Average fuel consumption (km/L) | Improvement rate (%) |
|---|---|---|---|---|
| 2 | 25120 | 41.1 | 11.1 | 28 |
| 3 | 18038 | 43.9 | 10.9 | 25 |
| 4 | 10253 | 43.6 | 10.7 | 23 |
| 5 | 9420 | 44.3 | 10.4 | 20 |
| 6 | 8475 | 44.8 | 10.2 | 17 |
| 8 | 6510 | 46.9 | 9.8 | 13 |
| 10 | 4486 | 47.5 | 9.4 | 8 |
| 15 | 3279 | 48.1 | 9.0 | 4 |
| 20 | 2355 | 50.1 | 8.9 | 2 |
| No filling | | 100 | 8.7 | 0 |

As a result, in the case of the space rate exceeding 50% (in the case of the space rate of 50.1% example), the improvement rate was as slight as 2%, but if the space rate is 50% or less (case of the space rate of 48.1% as an example), the rate was doubled to 4%, and a far more remarkable rise of the improvement rate was confirmed with 17% at the rate of 45% or less (44.8%).

Also, for the surface area of the catalytic material per displacement of 1000 cc, improvement in fuel cost can be found even in 5000 $cm^2$ or less, but the improvement rate rose by nearly 10% in 5000 $cm^2$ or more (13% in 6510 $cm^2$) and a far more remarkable improvement by about 20% or more was confirmed in 10000 $cm^2$ or more (23% in 10253 $cm^2$).

From the results, by setting the space rate to 50% or less, preferably 45% or less, a remarkable improvement of fuel cost can be confirmed and at the same time, a remarkable improvement of fuel cost was confirmed with the surface area of the catalytic material per displacement of 1000 cc at 5000 $cm^2$ or more, preferably at 10000 $cm^2$ or more.

Thus, the broadest claims that follow are not directed to a machine that is configuration a specific way. Instead, said broadest claims are intended to protect the heart or essence of this breakthrough invention. This invention is clearly new and useful. Moreover, it was not obvious to those of ordinary skill in the art at the time it was made, in view of the prior art when considered as a whole.

Moreover, in view of the revolutionary nature of this invention, it is clearly a pioneering invention. As such, the claims that follow are entitled to very broad interpretation as to protect the heart of this invention, as a matter of law.

It will thus be seen that the objects set forth above, and those made apparent from the foregoing description, are efficiently attained. Also, since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described;

What is claimed is:

1. A fuel reformer arranged in a fuel supply system leading from a fuel supply source to a combustion apparatus, said fuel reformer comprising:

a casing provided with an inlet communicating with said fuel supply source, an outlet communicating with said combustion apparatus, said casing including a process chamber communicating with said inlet and outlet, a granular catalytic material filled in said process chamber, said granular material including a core having a layer of metal oxide formed on the surface of said core, said layer having a structure in which a bonding quantity of oxygen gradually decreases with increasing depth from an upper surface of said layer, said layer of metal oxide providing photocatalytic property which activates the fuel to be reformed, said catalytic material is filled in said process chamber at a space rate of 50% or less as defined in the following equation:

space rate (%)=((capacity inside the process chamber−total volume of the catalytic material)/capacity inside the process chamber)×100, and said combustion apparatus is an engine and said catalytic material is filled in said process chamber so that the total of the surface area of the catalytic material filled in said process chamber is 5,000 $cm^2$ or more per displacement of 1,000 cc of the engine.

2. A fuel reformer according to claim 1, wherein a particle diameter of said catalytic material is 20 mm or less.

3. A fuel reformer according to claim 1, wherein said core has a hollow structure.

4. A fuel reformer according to claim 1, wherein said core has an open piercing hole lined with said layer.

5. A fuel reformer according to claim 1, wherein said casing is provided with a cylindrically formed body portion and lid bodies covering end openings of said body portion, and at least one of said lid bodies is removably attached to one of said end openings of said body portion.

6. A fuel reformer according to claim 1, wherein at least end of said process chamber is defined by a mesh-state material.

7. A fuel reformer arranged in a fuel supply system leading from a fuel supply source to a combustion apparatus, said fuel reformer comprising:

a casing provided with an inlet communicating with said fuel supply source, an outlet communicating with said combustion apparatus, said casing including a process chamber communicating with said inlet and outlet, a granular catalytic material filled in said process chamber, said granular material including a core having a layer of metal oxide formed on the surface of said core, said layer having a structure in which a bonding quantity of oxygen gradually decreases with increasing depth from an upper surface of said layer, said layer of metal oxide providing photocatalytic property which activates the fuel to be reformed, said catalytic material is filled in said process chamber at a space rate of 50% or less as defined in the following equation:

space rate (%)=((capacity inside the process chamber−total volume of the catalytic material)/capacity inside the process chamber)×100, and said catalytic material is filled in said process chamber so that the total of the surface area of the catalytic material filled in said process chamber is 5,000 cm$^2$ or more per flow rate 0.1 L/min of the fuel passing through said process chamber.

8. A fuel reformer according to claim 7, wherein the particle diameter of said catalytic material is 20 mm or less.

9. A fuel reformer according to claim 7, wherein said catalytic material has a hollow structure.

10. A fuel reformer according to claim 7, wherein said core has an open piercing hole lined with said layer.

11. A fuel reformer according to claim 7, wherein said casing is provided with a cylindrically formed body portion and lid bodies covering end openings of said body portion, and at least one said lid bodies is removably attached to one of said end openings of said body portion.

12. A fuel reformer according to claim 7, wherein at least one end of said process chamber is defined by a mesh-state material.

13. A fuel reformer, comprising:

a casing provided with an inlet for communicating with a fuel supply source, an outlet for communicating with a combustion apparatus, said casing including a)process chamber communicating with said inlet and outlet, a granular catalytic material filled in said process chamber, said granular material including a core having a layer of metal oxide formed on the surface of said core, said layer having a structure in which a bonding quantity of oxygen gradually decreases with increasing depth from an upper surface of said layer, said layer of metal oxide providing photocatalytic property which activates the fuel to be reformed, and said core including an open piercing hole lined with said layer.

* * * * *